US007261811B2

(12) United States Patent
Nakhla et al.

(10) Patent No.: US 7,261,811 B2
(45) Date of Patent: Aug. 28, 2007

(54) LIQUID-SOLID CIRCULATING FLUIDIZED BED WASTE WATER TREATMENT SYSTEM FOR SIMULTANEOUS CARBON, NITROGEN AND PHOSPHORUS REMOVAL

(75) Inventors: George Nakhla, Woodbridge (CA); Jingxu Zhu, London (CA); Yubo Cui, Changchun (CN)

(73) Assignee: The University of Western Ontario, London, Ontario (CA)

( * ) Notice: Subject to any disclaimer, the term of this patent is extended or adjusted under 35 U.S.C. 154(b) by 262 days.

(21) Appl. No.: 10/784,890

(22) Filed: Feb. 24, 2004

(65) Prior Publication Data

US 2004/0178132 A1    Sep. 16, 2004

Related U.S. Application Data

(63) Continuation-in-part of application No. 09/676,453, filed on Oct. 2, 2000, now Pat. No. 6,716,344.

(51) Int. Cl.
C02F 3/30 (2006.01)
C02F 3/08 (2006.01)
B01D 24/36 (2006.01)

(52) U.S. Cl. .................. 210/151; 210/189; 210/221.2; 210/258; 210/284; 210/903; 210/906

(58) Field of Classification Search ............... 210/189, 210/284, 150, 151, 220, 221.2, 252, 258, 210/259, 615–617, 903, 906
See application file for complete search history.

(56) References Cited

U.S. PATENT DOCUMENTS 5,670,047 A * 9/1997 Burke ..................... 210/603

(Continued)

FOREIGN PATENT DOCUMENTS

CA    2205003    5/1996

(Continued)

OTHER PUBLICATIONS

Kunii, D. And Levenspiel, O., Fluidization Engineering, Butterworth-Heinemann, Stoneham, MA, USA (1991).

(Continued)

*Primary Examiner*—Fred G. Prince
(74) *Attorney, Agent, or Firm*—Lynn C. Schumacher; Hill & Schumacher (57) ABSTRACT

Biological nutrient removal (BNR) in municipal wastewater treatment to remove carbonaceous substrates, nutrients and phosphorus, has recently become increasingly popular worldwide due to increasingly stringent regulations. Biological fluidized bed (BFB) technology, which could be potentially used for BNR processes, can provide some advantages such as high efficiency and compact structure. This present invention incorporates the fixed-film biological fluidized bed technology with the biological nutrient removal in a liquid-solid circulating fluidized bed, which has achieved the simultaneous elimination of organic carbon, nitrogen and phosphorus, in a very efficient manner and with very compact space requirements. The BNR-LSCFB has two fluidized beds, running as anoxic/anaerobic and aerobic processes to accomplish simultaneous nitrification and denitrification and to remove carbonaceous substrates, nutrients and phosphorus, with continuous liquid and solids recirculation through the anoxic/anaerobic bed and the aerobic bed. The new BNR-LSCFB system is not only an excellent alternative for conventional activated sludge type BNR technologies but is also capable of processing much higher loadings and suitable for industrial applications.

20 Claims, 2 Drawing Sheets

The schematic diagram of the Liquid-Solid Circulating Fluidized Bed Biological Nutrient Removal system

U.S. PATENT DOCUMENTS 5,961,830 A * 10/1999 Barnett .................. 210/603
6,716,344 B1 * 4/2004 Bassi et al. ............. 210/189

FOREIGN PATENT DOCUMENTS

CA 2498747 3/2004

OTHER PUBLICATIONS

Weber, W. J., Hopkins, C. B. And Bloom, R., Physical-chemical treatment of wastewater. J. Wat. Pollut, Control Fed., 42, 83-88 (1970).

Jeris, J.S. and Owens, R. W., Polit-scale high-rate biological dentrification, J. Wat. Pollut. Control Fed., 47, 2045-2057 (1975).

Hoyland, G. And Robinson, P.J., Aerobic treatment in OXITRON biological fluidized bed plant at Coleshill, Wat. Pollut. Control, 82, 479-493 (1983).

Cooper, P.F. and Williams, S. C., High-rate nitrification in a biological fluidized bed, Wat. Sci. Tech., 22, 431-442 (1990).

Semon, J., Sadick, T., Palumbo, D., Santoro, M and Keenan, P., Biological upflow fluidized bed dentrification reactor demonstration project—Stanford, CT, USA, Wat. Sci. Tech., 36, 139-146 (1997).

Zhu, J., Zheng, Y., Dimitre G. Karamanev and Amarjeet S.B., (Gas-) Liquid-solid circulating fluidized beds and their potential applications to bioreactor engineering, Can. J. Chem. Eng., 78, 82-94 (2000).

Liang, W.G., Zhang, S.L., Zhu, J.X., Yu, Z. Q., Jin, Y. And Wang, Z.W., Flow characteristic of the liquid-solid circulating fluidized bed, Power Technol. 90, 95-102 (1997).

Zheng, Y., Zhu, J.Z., Bassi, A.S. and Margaritis, A., The axial hydrodynamic behaviour in a liquid-solid circulating fluidized bed. Can. J. Chem. Eng. 77, 284-290 (1999).

Zheng, Y., Zhu, J.-S., Marwaha, N.S. and Bassi, A.S., "Radical solids flow structure in a liquid-solids circulating fluidized bed", Chem. Eng. J., 88(2), 141-150, 2002.

Liang, W.-G., Wu, Q.-W., Uy, Z.-Q., Jin, Y. And Bi, X-T., Flow regimes of the three-phase circulating fluidized bed, American Institute Chem. Eng. J., 41, 267-271 (1995).

Liang, W.-G., Yu, Z.-Q., Jin, Y., Wang, Z.-W., and Wu, Q.-W., Phase holdups in a gas-liquid-solid circulating fluidized bed, Chem. Eng. J. & Biochem. Eng. J., 58, 259-264 (1995).

Liang, W.-G., Wu, Q.-W., Uy, Z.-Q., Jin, Y. And Wang, Z.-W., Hydrodynamics of a gas-liquid-solid three phase circulating fluidized bed, Can. J. Chem. Eng., 73, 656-661 (1995).

Robinson JA, Trulear AG, and Characklis WG, Cellular Reproduction and Extracelluar Polymer Formation by Pseudomonas aeruginosa in Continuous Cultures, Biotechnol. & Bioeng., XXV, 1409, (1984).

Chian ES, and DeWalle FB, Treatment of High Strength Acidic Wastewater with a Completely Mixed Anaerobic Reactor, Water Research, 11, 295-304, (1977).

Rogalla F., Payradeau M., Bacquet G, Bourbigot, MM and Sibony J, Nitrification and Phosphorus Precipitation with Biological Aerated Fillers, Water Environ. Res., 62(2), 169-176, (1990).

Switzenabum MS, and Jewel WJ, Anaerobic attached-film expanded bed reactor treatment, J. Water Pollution Control Fed. 52, 1953-1965.

Casey TG, Wentzel MC, Ekama GA, Lowenthal RE, and Marais GVR, "A Hypothesis for the Causes and Control of Anoxic-Aerobic (AA) Filament Bulking in Nutrient Removal Activated Sludge Systems", Water Sci. Tech., 290 (7), 203-212, 1994.

Musvoto EV, Casey TG, Ekama GA, Wantzzel MG and Marais GVR, The Effect of Incomplete Dentrification on Anoxic-Aerobic (Low-F/m) Filament Bulking in Nutrient Removal Activated Sludge Systems, Water Sci. Tech., 29(7), 295-299, 1994.

Van Dijk, J.C. and Braakensiek, H. Phosphate removal by crystallization in a fluidized bed. Wat. Sci. Tech., 17, 133-142 (1985).

Battistoni, P., Pavan, P., Cecchi, F. And Mata-Alvarez, J. Phospate removal in real anaerobic supernatants: Modelling and performance of a fluidized bed reactor. Wat. Sci. Tech., 38, 275-283 (1998).

Zweger B, Arnold E and Wildever PA, Nutrient Balances for Combined Nitrification and Dentrification in Biofilters, Water Sci. Tech., 4(4), 91-95, 2000.

Burton, Franklin L., Wastewater Engineering Treatment, Disposable and Reuse, Third Edition, Metcalf & Eddy, Inc., pp. 614-635, date unknown.

* cited by examiner

PRIOR ART

Figure 1 - A typical suspended growth Biological Nutrient Removal process

Figure 2 - The schematic diagram of a typical embodiment of the fixed-film Biological Nutrient Removal process in the present invention Figure 3 - The schematic diagram of the Liquid-Solid Circulating Fluidized Bed Biological Nutrient Removal system

LIQUID-SOLID CIRCULATING FLUIDIZED BED WASTE WATER TREATMENT SYSTEM FOR SIMULTANEOUS CARBON, NITROGEN AND PHOSPHORUS REMOVAL

CROSS REFERENCE TO RELATED U.S. APPLICATIONS

This patent application is a continuation-in-part application of U.S. patent application Ser. No. 09/676,453 filed on Oct. 2, 2000 now U.S. Pat. Ser. No. 6,716,344, which has now been allowed and which is incorporated herein by reference in its entirety.

FIELD OF THE INVENTION

The present invention relates to a fluidized bed, and more particularly the present invention relates to a liquid-solid and gas-liquid-solid circulating fluidized bed arrangement specially suited for wastewater treatment and the simultaneous removal of carbon, nitrogen and phosphorus.

BACKGROUND OF THE INVENTION

Fluidization technology has been developed for close to one century from its first application to coal gasification by Winkler in the 1920s [1]. Since then, fluidized beds have been used for many different applications such as gas-liquid, liquid-solid, and gas-liquid-solid contactors and to carry out a variety of different processes as chemical and biological reactors.

The application of fluidized beds to the biological wastewater treatment processes originated from observations of denitrification, made whilst using activated carbon to remove organic compounds from chemically treated sewage in a fluidized bed [2]. Since then, biological fluidized beds (BFBs) have been investigated for carbon oxidation, nitrification, denitrification and anaerobic treatment, for a wide variety of waters and wastewaters [3, 4, 5, 6]. In contrast to conventional biofilm reactors, in which media are fixed, the media immobilized on particles in a BFB are suspended by drag force exerted by the upflowing wastewater. Hence, BFBs have the advantages of increased liquid-solid interfacial area, enhanced contact between liquid and media, and increased liquid flowrate.

Biological fluidized beds are usually liquid-solid fluidized beds or gas-liquid-solid fluidized beds when air is added to the system for aerobic process. Fluidization of liquid-solid systems is controlled by the liquid flow rate [7]. For a given liquid-solid system, the bed is initially fixed when liquid flow rate is lower than the minimum fluidization velocity, $U_{mf}$. When liquid velocity exceeds $U_{mf}$, the operation of the bed is transferred into the conventional particulate liquid-solid fluidization regime. In a conventional particulate liquid-solid fluidized bed, solid particles are nearly uniformly suspended in the liquid and are therefore in good contact with the liquid phase, with excellent interfacial mass transfer due to the continuous movement of the particles in the liquid and the drag exerted by the liquid. With a further increase of the liquid velocity, some particles begin to be transported out of the bed. At this time, the fluidized bed is in the transition from the conventional fluidization regime to the circulating fluidization regime [7, 8, 9, 10]. When the liquid velocity is sufficiently high, large quantity of particles are transported out of the bed. At this point, the bed has entered the circulating fluidization regime to form a circulating fluidized bed (CFB). Circulating fluidized bed (CFB) provides even higher liquid-solid contact mass transfer efficiency and higher liquid throughput than conventional fluidization. It also facilitates easy solid feed into and discharge from the beds. In the case of gas-liquid-solid (three-phase) fluidized bed, air or other gases is injected, normally at or near the bottom of the bed, to assist the liquid in fluidizing the solid particles. Gas passes through the bed as rising bubbles while interacting with the liquid and solid particles. Similar transitions occur from the fixed bed, to a conventional gas-liquid-solid (three-phase) fluidized bed, and then to a circulating gas-liquid-solid (three-phase) fluidized bed [11-13].

The advantages of BFBs can be utilized to increase the efficiency of wastewater treatment processes. Traditionally, the most conventional and widely used design for municipal and industrial wastewater treatment is the activated sludge (AS) process, which employs a primary clarifier, an aeration tank, and a secondary clarifier. Phosphorus removal is achieved by chemical addition and nitrogen is merely converted from the more toxic ammonia form to nitrates. The process is classified as a suspended-growth system in which microbes responsible for treatment are in suspension. "Fixed-film" bioreactors have some advantages over the conventional activated sludge process. In fixed-film bioreactors, bacterial films are immobilized on an attachment media rather than remain in suspension by themselves. Due to the immobilization of biomass on media, the loss of biomass by shearing is the only mechanism for the escape of biosolids in the bioreactor effluent. The sloughed biomass is mostly decaying biomass that has good settling characteristics and can be readily separated from the liquid [14]. The most salient advantage of fixed-film vis-à-vis suspended growth systems is higher biomass densities per unit volume, resulting not only in more compact bioreactor sizes but also better ability to handle shock organic loadings as well as mitigate inhibition and toxic impacts. Other advantages include enhanced retention of biosolids, and better sludge settling characteristics which affect sizing of secondary clarifiers. The most commonly used fixed-film processes in wastewater treatment are trickling filters, and rotating biological contactors (RBCS) [15]. Anaerobic filters [16] and aerated biological filters [17], are also used, albeit less frequently than trickling filters and RBCs. When the biofilm is immobilized on solid carriers, the advantages of biological fluidized beds (BFBs), such as increased liquid-solid interfacial area and enhanced contact between liquid and media, can be utilized to further increase the efficiency of the fixed-film bioreactors [18]. It should be noted that such biological fluidized beds fixed-film bioreactors are all operated in the conventional particulate fluidization regime, with relatively low liquid velocities.

Figure 1:
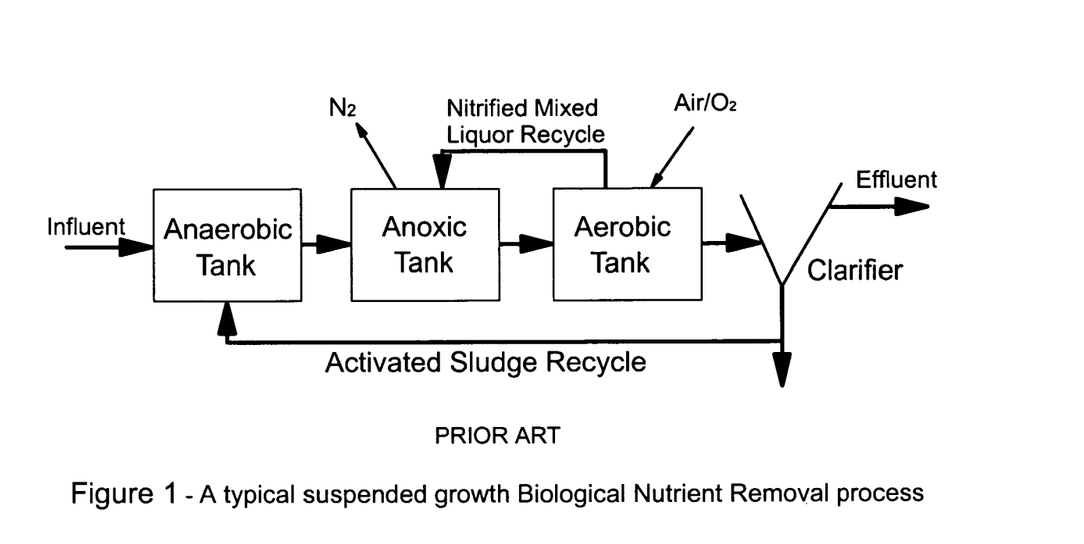
FIG. 1 illustrates a typical Prior Art suspended growth biological nutrient removal process for treatment of wastewater.

These processes (suspended growth and fixed-film bioreactors including fixed-film BFB), however, can only achieve secondary effluent quality and additional treatment is required for nitrogen (N) and phosphorus (P) removals. To address the above problem and in response to increasingly stringent effluent nutrient criteria as a result of deteriorating surface water quality, biological nutrient removal (BNR) processes have become increasingly popular recently. In BNR processes, nitrogen and phosphorus can be removed simultaneously. These BNR processes, as shown in FIG. 1, are essentially suspended growth systems, which employ a combination of anaerobic, anoxic, and aerobic suspended growth biological reactors with or without primary clarification. BNR processes involve diverse microbial groups and utilize the ability of selected microbes, known as phosphorous accumulating organisms (PAO) to undertake luxury phosphorus uptake, whereby some of the phosphorus stored in the cells is released during anaerobic conditions to be followed by a greater phosphorus uptake during aerobic conditions. Furthermore denitrifying bacteria that can elicit oxygen from nitrates reduce the organic loading to be treated aerobically.

BNR processes are known to offer several advantages over the more conventional activated sludge processes, namely superior effluent quality, a significant reduction in aeration energy requirements due to utilization of formed nitrates to remove organic matter, improved sludge settling characteristics, a reduction in sludge quantities due to lower bacterial yields in the anoxic tanks, and the elimination/minimization of chemical sludge. Although BNR activated sludge systems require more process controls as compared to conventional activated sludge systems, advances in process controls and data logging capabilities have significantly reduced human requirements and thus both systems now require comparable operator attendance. Consequently these BNR processes offer significant savings in both capital and operation/maintenance cost, in addition to the advantages of BNR over conventional activated sludge systems and their ability to meet stringent total nitrogen and phosphorus effluent criteria.

On the other hand, however, the reliability of the activated sludge BNR process in response to influent changes both in terms of quantity and characteristics (i.e. COD —Chemical Oxygen Demand), N, P, COD/P and COD/N ratios) have been questioned to the extent that many BNR plants have standby chemical dosing systems for P removal. Incomplete denitrification and low food to microorganisms (F/M) ratio have been observed to cause filamentous bulking conditions in BNR activated sludge systems [19, 20]. In some cases, external sources of carbon may be required to achieve P & N removal, because of low concentrations of readily biodegradable organics.

In view of the aforementioned shortcomings of the suspended growth BNR processes, there is a need to develop more effective BNR wastewater treatment processes. It would be ideal if the BNR concept can be combined with the fixed-film BFB process so that advantages of both processes can be utilized simultaneously. So far, no BFBs (without the combination with BNR) have accomplished effective phosphorus removal without using some chemical methods [21, 22]. To the best of our knowledge, a reliable BFB fixed-film BNR process that simultaneously achieves biological phosphorus and nitrogen removal has not been developed. Although nitrogen removal by simultaneous nitrification-denitrification has been accomplished in biological filters [23] by alternating oxic and anoxic conditions within the filter, very low nitrogen removal efficiencies (~20% influent nitrogen) have been achieved.

It would be very advantageous to provide a high-efficiency biological fluidized bed for simultaneous removal of carbon, nitrogen and phosphate. However, one of the key difficulties is how to arrange the three different processes, anaerobic, anoxic and aerobic processes, in an integrated fluidized bed system.

SUMMARY OF THE INVENTION

It is the object of the present invention to provide a fixed-film Biological Nutrient Removal (BNR) wastewater treatment system using a (Gas-) Liquid-Solid Circulating Fluidized Bed (LSCFB or GLSCFB) for carbon, nitrogen, and phosphorus removal.

Figure 2:
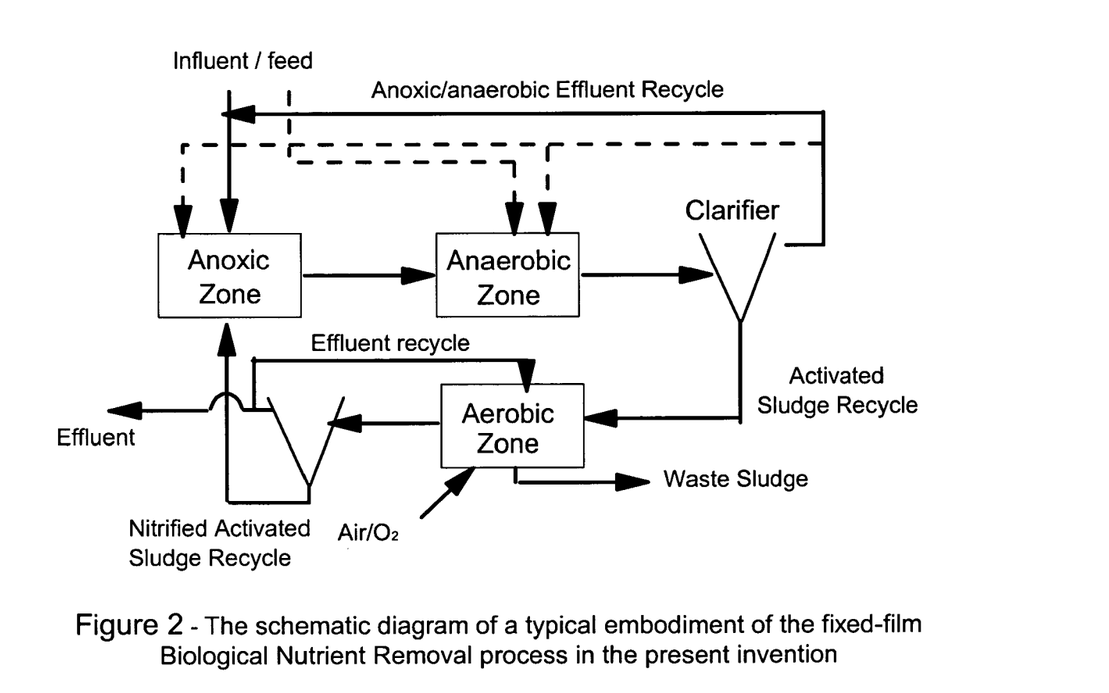
FIG. 2 shows a schematic block diagram of an embodiment of the fixed-film biological nutrient removal process according to the present invention.

Disclosed herein is a new fixed-film BFB BNR process, as shown in FIG. 2, realized in a new liquid-solid circulating fluidized bed system (LSCFB), which may also be called a gas-liquid-solid circulating fluidized bed system (GLSCFB) considering the injection of air into at least one of the fluidized bed in the system. LSCFB and GLSCFB are relatively new types of chemical and biological processors, that have only been studied very recently [7-13]. To the inventors' knowledge, although LSCFB and GLSCFB offer many distinct advantages for many chemical and bioprocesses, they have not been applied in any wastewater treatment process including the BNR processes. The new LSCFB/GLSCFB technology utilizes the high contact efficiency of the fluidized bed and integrate all three treatment zones of a BNR, anaerobic, anoxic and aerobic zones, into a single unit, the LSCFB/GLSCFB. It will be understood that hereinafter, that when reference is being made to liquid-solid circulating fluidized bed systems (LSCFB), it is also referring to gas-liquid-solid circulating fluidized bed systems (GLSCFB).

The BNR-LSCFB system has two fluidized beds inter-connected to form a solids circulation system: the riser fluidized bed where both liquid and particles move co-currently upwards and the downer fluidized bed where the liquid and air flows upwards in counter-current with the downflow particles. In the above instance, the riser is a liquid-solid fluidized bed, while the downer is a gas-liquid-solid fluidized bed). LSCFB (including GLSCFB) is a relatively new type of (bio-) chemical processor, which has only been studied recently [7, 8, 9, 10, 11, 12, 13]. The BNR-LSCFB system has been recently developed for wastewater treatment by the inventors to establish a novel fixed-film BNR process. Although LSCFB offers many distinct advantages for many chemical and bioprocesses such as better interfacial contacting and reduced backmixing, it has not been applied in any wastewater treatment processes including the BNR processes. An additional benefit of LSCFB is that it has two separate fluidized beds where two separate processes such aerobic and anoxic processes, can be accommodated in the same system.

In one aspect of the present invention there is provided a liquid-solid circulating fluidized bed system, comprising a first fluidized bed, means to feed solid particles having effective immobilized bacteria coated thereon into the first fluidized bed adjacent to a first end of the first fluidized bed and means to feed a first fluid into the first fluidized bed adjacent to a second end of the first fluidized bed, the second end being remote from the first end so that the solid particles and the first fluid flow in counter current. The fluidized bed system also includes a second fluidized bed, the second fluidized bed being a riser fluidized bed wherein a means for introducing the solid particles and a means for introducing a second fluid into the second fluidized bed are both adjacent to one end of the second fluidized bed so that the solid particles and the second fluid introduced into the second bed flow concurrently through the second bed from the one end toward another end of the second fluidized bed remote from the one end. The system includes gas injection means to inject gas into one or both of the first and second liquid fluidized beds. The first means connecting the first fluidized bed to the second fluidized bed adjacent to the second end of the first fluidized bed and said one end of the second fluidized bed, said first connecting means includes means to feed the solid particles into the second fluidized bed. The system includes second means connecting the first and the second fluidized beds adjacent the first end of the first bed and the other end of the second fluidized bed, the second means connecting includes the means to feed the solid particles into the first fluidized bed.

In another aspect of the invention there is provided a method for biological nutrient removal in a wastewater feed stream to remove carbon, nitrogen and phosphorus therefrom, comprising the steps of:

flowing a raw wastewater feed and a recycle stream into a first fluidized bed and passing solid particles having effective immobilized bacteria coated thereon and a first fluid through the first fluidized bed, the first fluidized bed including a zone maintained under anoxic conditions suitable for denitrification of the first fluid flowing therethrough;

flowing said solid particles with effective immobilized bacteria coated thereon and the first fluid through an anaerobic zone wherein stored phosphorus is released;

separating some of said first fluid from said solid particles with effective immobilized bacteria coated thereon to form said recycle stream and transferring said solid particles and a remaining amount of the first fluid into a second fluidized bed, and mixing said recycle stream with said raw wastewater feed at an input to said first fluidized bed;

passing the particles having effective immobilized bacteria coated thereon with a stream of a second fluid through the second fluidized bed, the second fluidized bed having an aerobic zone under controlled aerobic conditions for biodegradation of constituents of the second fluid in the presence of oxygen to carbon dioxide, water, and nitrates by the immobilized bacteria to produce nitrified effluent from the aerobic zone; and transferring the solid particles with effective immobilized bacteria coated thereon from said second fluidized bed to the first fluidized bed along with some of the nitrified effluent and separating the remaining nitrified effluent from said solid particles with effective immobilized bacteria coated thereon and removing a portion of the remaining nitrified effluent from the system as treated effluent and recycling a remaining portion of the remaining amount of the nitrified effluent back into an input to the second fluidized bed to mix with said remaining amount of the first fluid to form the second fluid, and mixing said some of the nitrified effluent with the mixture of raw wastewater feed and the recycle stream at the input of the first fluidized bed to form the first fluid.

BRIEF DESCRIPTION OF THE DRAWINGS

Further features, objects and advantages will be evident from the following detailed description of the preferred embodiments of the present invention taken in conjunction with the accompanying drawings in which.

DETAILED DESCRIPTION OF THE INVENTION

Figure 3:
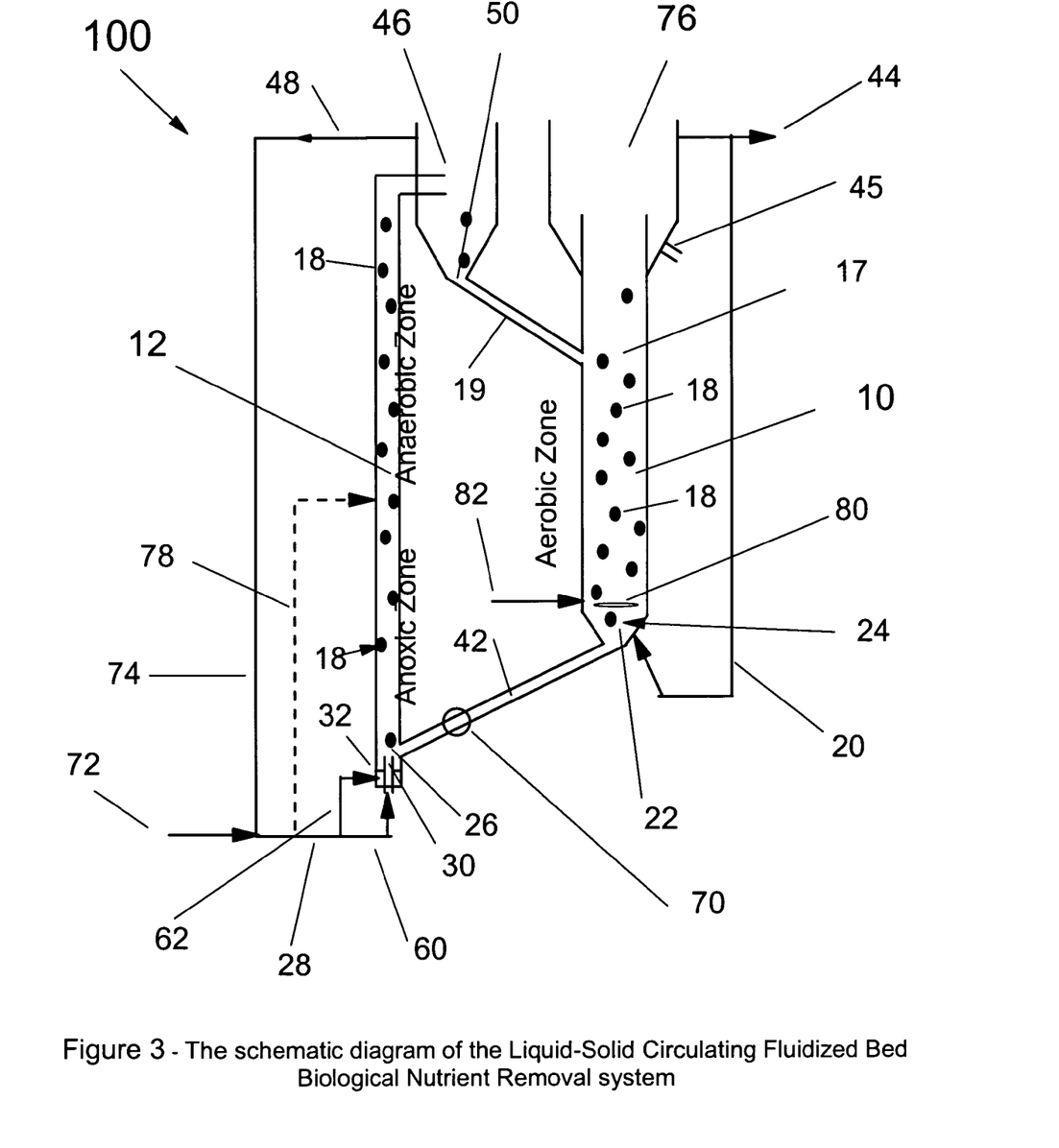
FIG. 3 is the schematic diagram of the liquid-solid circulating fluidized bed biological nutrient removal system.

Referring to FIG. 3 the present invention provides a liquid-solid circulating fluidized bed biological nutrient removal system shown generally at 100 comprised of a pair of fluidized beds, including a first fluidized bed 10 which is a downer column (aerobic bed) and a second fluidized bed 12 which is a riser column (anoxic and anaerobic bed), which are named according to the movement direction of the particles, a liquid-solid separator 46 on the top of the riser and a similar clarifier 76 on the top of the downer column 10. Both the separator 46 and the clarifier 76 also play a critical role for pressure balance between the riser column 12 and the downer column 10. Beds 10 and 12 are interconnected at their adjacent ends by connecting pipes that allow the circulation of solids between the two columns.

The first fluidized bed 10 is a conventional counter-current flow liquid-solid or more precisely gas-liquid-solid bed wherein solid particles 18 (for example, but not limited to, lava rock particles, zeolite, resin, silica sol-gel or other biomass carriers) enter from the top connecting pipe 19 near the top of the bed 10 as indicated by the line 17 and flow downward and a first fluidizing fluid such as the recycled effluent 20 enters the bed 10 as indicated schematically at 22 at the lower end 24 of the bed 10 and flows upward in a counter current relationship with respect to the particles 18. Additional gas such as air may be injected into the bottom of the bed 10 as shown at 82, through a gas distributor 80. Such gas will form bubbles in the bed 10 and flow upwards co-currently with the first fluidizing liquid. Because of the gas injection, the first fluidized bed in this case is actually a gas-liquid-solid fluidized bed. Without the gas injection, the first fluidized bed will be a liquid-solid fluidized bed. The clarifier 76 located at the top of the first fluidized bed 10 allows particles and sloughed sludge entrained by the upflowing fluid(s) to settle back into the first fluidized bed 10 in order to minimize the loss of particles through the effluent.

The second fluidized bed 12 on the other hand is a riser fluidized bed wherein the solid particles 18 transferred from bed 10 via the bottom connection pipe 42 enter the bed 12 adjacent to the lower end 26 of the bed 12 and flow upward in co-current relation with a second fluidizing fluid 28 (such as a mixture of the raw waste water feed 72 and the recycle 74 from the liquid-solid separator 46 located at the top of the riser 12) which enters the bed 12 under pressure in the illustrated arrangement through nozzle 30 and inlet 32 both adjacent to the lower end 26 of the bed 12 and flows upward through the bed 12 carrying the particles 18 in its flow. The second fluidized bed 12 as described is a liquid-solid riser fluidized bed operated in the liquid-solid circulating fluidization regime. Optionally, gas feed (not shown in FIG. 3) may also be injected into the lower end 26 of the bed 12, to form a gas-liquid-solid fluidized bed operated in the liquid-solid circulating fluidization regime.

The second fluidized bed 12 includes a distributor at the bottom end thereof which divides the incoming stream of the fluid 28 which is the mixture of feed 72 and recycle 74 into two sub-streams: a primary stream 60 and an auxiliary 62 streams. The primary stream 60 is introduced through nozzle 30 which projects into the second fluidized bed column 12. This design increased the pressure drop across the bottom solids return pipe 42 and makes the system more stable. The auxiliary stream 62 is introduced into the bottom 26 of the second fluidized bed 12 through a perforated plate inlet 32. The function of the auxiliary stream 62 is to stir up the particles 18 at the bottom of the second fluidized bed 12 to be entrained up the second fluidized bed by the combination of the primary and auxiliary liquid streams 60 and 62. The two streams 60 and 62 may also be combined into a single stream and fed through a single distributor at the bottom end 26 of the second fluidized bed 12.

As stated above, the solid particles 18 enter downer column 10 at inlet 17 and travel downward through the bed 10. After they have traversed the fluidized bed 10 the particles 18 enter into the lower connecting pipe 42, together with some entrained liquid, and are introduced into the second fluidized bed 12.

The column 10 includes the aerobic zone while the column 12 includes the anoxic zone and the anaerobic zone. In the aerobic zone, wastewater rich in organic matter as well as ammonia is biodegraded in the presence of oxygen from the input air, to carbon dioxide, water, and nitrates by the bacteria mainly immobilized on the solid particles. The continuous flow of air and wastewater ensures the sustainability of the aerobic biomass. In the anoxic zone, where the influent wastewater is mixed with the recycled nitrified activated sludge effluent from the aerobic zone, denitrification prevails. Nitrates in the nitrified stream from the aerobic section of column 10 is used as a source of oxygen to meet the oxygen demand of the wastewater. The wastewater feed and the decaying biomass sloughed from the aerobic section biofilm provide the carbon source for denitrification. The anaerobic zone is formed as the influent biodegradable wastewater constituents exert an oxygen demand above the anoxic zone. Since this demand is not met due to lack of oxygen/air inflow, anaerobic conditions prevail. In the anaerobic zone, stored phosphorus is released and volatile fatty acids are stored for further degradation in the aerobic zone.

During operation, biomass carriers with biofilm on them from the aerobic process are transported into the base of the second fluidized bed 12 through the bottom return pipe 42 to make up the particles 18 entrained up along the second fluidized bed 12. The bottom solids return pipe 42 operates most of the time as a packed moving bed but can also be at a semi-fluidized or conventionally fluidized state.

In the LSCFB waste water treatment system of the present invention, the circulation rate of the solid particles 18 may be controlled by a butterfly valve 70 located in the bottom return pipe 42. The splitting of the feed stream to the riser into two streams 60 and 62 with the second stream mobilizing the particles in the bottom section of the riser forms a further hydraulic valve that can also control the circulation rate of the solid particles 18. There are other possible types of hydraulic valves such as loop seal etc. Either a mechanical valve or a hydraulic valve or both can be used to control the flow rate of the solid particles 18. Normally, a mechanical valve is preferred over a hydraulic valve because the mechanical valve usually provides a higher and more stable pressure drop across the return pipe 42 and therefore makes the system more stable and also makes it easier to maintain a pressure balance between the two columns. The auxiliary liquid stream 62, if used together with the mechanical valve, provides additional control of the circulation rate of the solid particles 18.

The recycle stream 20 from the effluent 44 as above described enters at the bottom of the bed 10 and travels, together with the injected gas (mostly likely air) stream, in a countercurrent relationship
to the particles 18 through the downer column 10 and leaves at the top of column 10 as indicated at 44. The clarifier 76 at the top of the first fluidized bed 10 separates out the entrained particles 18 and sloughed sludge formed during the process, and returns them back to bed 10, before the gas and fluid exiting the column. The clarifier 76 also periodically discharge the sloughed sludge through a port (or ports) 45. The fluid exiting from column 10 at 44 is the effluent, part of which is released as treated water and part of which recycled back to the bottom of the downer column 10 to sustain the operation of the process.

The second fluidizing fluid 28 (which is a combination of raw waste water feed 72 plus the recycle stream 74 from the liquid-solid separator 46 at the top of the riser column 12) and the particles 18 along with some of the nitrified effluent from the aerobic zone from pipe 42 travel in co-current relationship upward through the bed 12 and then enter liquid-solid separator 46 (such as a settler) having a fluid outlet 48 through which most of the second fluidizing fluid 28 is removed and an outlet 50 for the particles 18 and some of the fluid from the fluidized bed 12 located at the bottom open to the upper connecting pipe 19. Solid particles from the separator 46, together with some entrained liquid, flows down via the upper connection pipe 19 to the inlet 17 in the downer column 10. If additional gas is injected to the bottom 26 of the riser column 12, the gas will travel co-currently upwards, together with the fluid, to fluidize the solid particles. Such gas will be separated out in the top separator 46.

Applications of the Present Invention

The application of the present invention will be further described below in relation to wastewater treatment, but it may be also used in other applications, for example effluent treatment from a host of industrial processes.

The present invention will now be illustrated using the following non-limiting example.

EXAMPLE

A flow diagram illustrating the fixed-film BNR process used in the LSCFB 100 (FIG. 3) of the present invention is illustrated in FIG. 2. In connection with FIG. 3, the aerobic process takes place in the downer bed 10 and the anoxic process takes place in the lower part of the riser bed 12 and the anaerobic process takes place in the upper part of the riser bed 12. An alternative is to have the anoxic process in the upper part of the riser and the anaerobic in the lower part of the riser. In this case, however, most of the nitrified effluent from the aerobic zone needs to be fed half way in the riser to the bottom of the anoxic zone. Raw wastewater 72 (primary influent or primary effluent) is first mixed with the anoxic/anaerobic effluent recycle stream 74 from the liquid-solid separator 46 at the top of the riser and then fed into the bottom of the riser bed 12 where the activated sludge loaded on the recirculating solid particles along with some previously nitrified wastewater from the aerobic process in the downer bed 10 which is also mixed with the raw wastewater 72 and the anoxic/anaerobic effluent recycle stream 74. The fluid containing the raw wastewater, effluent recycle stream 74, the previously nitrified wastewater and the solid particles loaded with microbes, flow co-currently up the riser 12 while contacting each other. The riser column 12 operates in the liquid-solid circulating fluidization regime and provides excellent interfacial mass transfer between the liquid and the activated sludge, thus significantly enhancing the process intensity. In the lower section of the riser 12, anoxic conditions that are conducive to denitrification prevail. The carbon source for denitrification in the bottom half of the riser can either be a portion of the wastewater feed or the decaying biomass sloughed from the downer bed biofilm, or both. Then, wastewater flows further upwards into the anaerobic zone maintained in the upper half of the riser, where stored phosphorus is released and volatile fatty acids are stored for further degradation in the aerobic zone. The elimination of nitrates upstream of the anaerobic zone will greatly enhance phosphorus release and subsequent uptake in the aerobic downer bed 10. It is important to note that since liquid-solid separation and subsequent solid recycle to the downer bed 10 occurs immediately after the anaerobic phase, enhanced phosphorus uptake in the aerobic downer bed will also likely take place.

In the liquid-solid separator 46 at the top of the riser 12, the solid particles loaded with microbes are separated out from the liquid stream and, along with some effluent liquid also from the liquid-solid separator 46, are introduced into the top of the downer bed 10 through the upper connecting pipe 19. Treated wastewater that comes with the recirculated solids from the riser 12 is joined at the top inlet 17 of the downer bed 10 by recycled effluent from downer column 10 flowing up through the downer bed 10. Part 20 of the combined stream equivalent to approximately 5-15 times of the wastewater feedrate is recycled into the downer bed 10 and the remaining part 44 exits the system as treated effluent. The recycled liquid 20 is also used to fluidize the downer bed 10 so that it is essential to introduce it into the downer bed 10 from the bottom, near the injection port for air (or oxygen containing gas). By provision of air in the downer bed 10 and control of air flowrate, and by control of the recycled liquid flowrate, the aerobic zone can be well maintained in the downer bed 10 under the conventional gas-liquid-solid three-phase fluidization regime. The solids attached with biomass flow by gravity to the bottom of the downer bed 10, and then into the riser bottom through the bottom inclined connection pipe 42. Some of the sloughed sludge formed during the process is periodically discharged from the aerobic zone through outlet 45 in clarifier 76. The system can be designed such that the fluid flow from the downer bed to the bottom of the riser 12 is of an appropriate recycle flowrate (e.g., 4 folds the influent flow rate), to simulate recirculation of nitrified mixed liquor from the aeration tank to the anoxic tank in a conventional activated sludge type BNR system.

Another alternative is to feed the wastewater halfway in the riser to the anaerobic zone, as shown by the dotted line in both FIGS. 2 and 3 (78). In such a case, a portion of the effluent from the riser needs to be recycled to the bottom of the riser, to fluidize the bottom anoxic portion of the riser.

This fixed-film biological nutrient removal (BNR) LSCFB process combines the advantages of the suspended growth BNR process with those of the fixed-film in a single unit. In addition to the advantages of the fixed-film processes with respect to sludge settle-ability and accordingly to the reduced size of the clarifiers for liquid-solid separation, the LSCFB re-circulates attachment media with high settling velocities, such that only a small liquid-solid separation tank is needed instead of a separate clarifier. Furthermore, due to fluidization, the BNR-LSCFB can handle both soluble and particulate-laden wastewater, thus possibly eliminating the need for primary clarifiers. More specifically, the BNR-LSCFB system disclosed herein offers the following advantages over the widely employed conventional activated sludge and the more recently developed suspended growth BNR systems.

1) A much smaller area and very compact reactor sizes, due to higher biomass density per unit bioreactor volume and the elimination of both primary and secondary clarifiers;
2) the minimization of operational labour requirements with the elimination of routine tasks such as solids analysis in the aeration tank and the return of activated sludge, cleaning of clarifier weir launders, wasting sludge, control of chemical dosing and maintenance of chemical feed systems;
3) an enhanced process stability as a result of better biosolids retention;
4) the capability to handle simultaneously soluble and particulate wastes due to the suspension of particulates within the fluidized-beds;
5) less vulnerability to shock loadings of toxicants and inhibitory substances as a result of lower toxicant-to-biomass ratios than in suspended-growth;
6) the minimization/elimination of chemical addition for phosphorus removal;
7) a significant reduction in sludge generation and the minimization of chemical sludge compared to the activated sludge system due to lower bacterial yields in the anoxic tank, and the minimization of biological sludge compared to the BNR system due to its operation at a much longer solids residence time and accordingly much higher biomass decay rates;
8) a substantial reduction in oxygen requirements and thus major savings in energy requirements;
9) the potential reduction in organic carbon requirements for nutrient-removal due to enhanced utilization of particulate substrates as a result of better entrapment in the fluidized bed as well as decaying biofilm as a carbon source.

In summary, the process offers the potential to achieve a highly treated effluent quality at significant cost savings in capital and operation/maintenance costs compared to existing technologies, with remarkable process stability. In addition, while this fixed-film BNR LSCFB process is applicable to any municipal wastewater treatment application, it is particularly advantageous for treatment of wastes from industries that very often have space limitations and special needs. For example, this technology can be used to treat specific concentrated streams of industrial wastewater as well as to provide end-of-pipe treatment to the overall wastewater. The other potential principal application of the technology would be small communities and new developments, which have limited financial resources, given the drastically reduced cost, space, and energy requirements.

In studies carried out by the inventors, experiments, soluble COD concentrations in the effluent ranging from 4 to 20 mg/L were obtained at varying COD loading rates; ammonia nitrogen removal efficiencies averaged in excess of 99% at a minimum total hydraulic retention time (HRT) of 2.2 hours over a temperature range of 25° C. to 28° C. Effluent nitrate nitrogen concentration of less than 5 mg/L was achieved by increasing nitrified liquid recycle rate. No nitrite accumulation could be observed either in the anoxic bed or in the aerobic bed. The BNR-LSCFB appears to be not only an excellent alternative for conventional activated sludge type BNR technologies but also capable of processing much higher loadings and suitable for industrial applications.

It will be appreciated that the apparatus and process of the present invention are not limited to having the aerobic section in the downer column 10 and the anoxic and anaerobic sections in the riser column 12, and that these may be reversed so that the aerobic section with gas injection may be located in the riser column 12 and the anoxic and anaerobic sections may be in the downer column 10.

It will be understood by those skilled in the art that the relative sizes of the riser bed 12 and downer bed 10 are dictated by the wastewater characteristics and treatment goals, and accordingly should specific requirements necessitate different relative sizing, the technology can readily be adapted to have an aerobic riser and an anoxic/anaerobic downer.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

REFERENCES

1 Kunii, D. and Levenspiel, O., Fluidization Engineering, Butterworth-Heinemann, Stoneham, Mass., USA (1991).
2 Weber, W. J., Hopkins, C. B. and Bloom, R., Physical-chemical treatment of wastewater. J. Wat. Pollut, Control Fed., 42, 83-88 (1970).
3 Jeris, J. S. and Owens, R. W., Polit-scale high-rate biological denitrification, J. Wat. Pollut. Control Fed., 47, 2045-2057 (1975).
4 Hoyland, G. and Robison, P. J., Aerobic treatment in OXITRON biological fluidized bed plant at Coleshill, Wat. Pollut. Control, 82, 479-493 (1983)
5 Cooper, P. F. and Williams, S. C., High-rate nitrification in a biological fluidized bed, Wat. Sci. Tech., 22, 431-442 (1990).
6 Semon, J., Sadick, T., Palumbo, D., Santoro, M and Keenan, P., Biological upflow fluidized bed denitrification reactor demonstration project-Stanford, Conn., USA, Wat. Sci. Tech., 36, 139-146 (1997).
7 Zhu, J., Zheng, Y., Dimitre G. Karamanev and Amarjeet S. B., (Gas-) Liquid-solid circulating fluidized beds and their potential applications to bioreactor engineering. Can. J. Chem. Eng., 78, 82-94 (2000).
8 Liang, W. G., Zhang, S. L., Zhu, J. X., Yu, Z. Q., Jin, Y. and Wang, Z. W., Flow characteristic of the liquid-solid circulating fluidized bed, Power Technol. 90, 95-102 (1997).
9 Zheng, Y., Zhu, J. X., Wen, J. Z., Bassi, A. S. and Margaritis, A., The axial hydrodynamic behaviour in a liquid-solid circulating fluidized bed. Can. J. Chem. Eng. 77, 284-290 (1999).
10 Zheng, Y., Zhu, J.-X., Marwaha, N. S. and Bassi, A. S., "Radial solids flow structure in a liquid-solids circulating fluidized bed", Chem. Eng. J., 88 (2), 141-150, 2002.
11. Liang, W.-G., Wu, Q.-W., Yu, Z.-Q., Jin, Y. and Bi, X-T., Flow regimes of the three-phase circulating fluidized bed, American Institute Chem. Eng. J., 41, 267-271 (1995).
12. Liang, W.-G., Yu, Z.-Q., Jin, Y., Wang, Z.-W., and Wu, Q.-W., Phase holdups in a gas-liquid-solid circulating fluidized bed, Chem. Eng. J. & Biochem. Eng. J., 58, 259-264 (1995).
13. Liang, W.-G., Wu, Q.-W., Yu, Z.-Q., Jin, Y. and Wang, Z.-W., Hydrodynamics of a gas-liquid-solid three phase circulating fluidized bed, Can. J. Chem. Eng., 73, 656-661 (1995).
14 Robinson J A, Trulear A G, and Characklis W G, Cellular Reproduction and Extracellular Polymer Formation by Pseudomonas aeruginosa in Continuous Cultures, Biotechnol. & Bioeng., XXV, 1409, (1984).
15 Metcalf and Eddy, Wastewater Engineering: Treatment, Disposal, and Reuse, McGraw Hill Publishing Co., 3 vol. Edition P, 604, (1991).
16 Chian E S, and DeWalle F B, Treatment of High Strength Acidic Wastewater with a Completely Mixed Anaerobic Reactor, Water Research, 11, 295-304, (1977).
17 Rogalla F., Payradeau M., Bacquet G, Bourbigot, M M and Sibony J, Nitrification and Phosphorus Precipitation with Biological Aerated Fillers, Water Environ. Res., 62(2), 169-176, (1990).
18 Switzenabum M S, and Jewel W J, Anaerobic attached-film expanded bed reactor treatment, J. Water Pollution Control Fed. 52, 1953-1965.
19 Casey T G, Wentzel M C, Ekama G A, Lowenthal R E, and Marais G V R, "A Hypothesis for the Causes and Control of Anoxic-Aerobic (AA) Filament Bulking in Nutrient Removal Activated Sludge Systems", Water Sci. Tech., 29(7), 203-212, 1994.
20 Musvoto E V, Casey T G, Ekama G A, Wantzzel M G and Marais G V R, The Effect of Incomplete Denitrification on Anoxic-Aerobic (Low F/m) Filament Bulking in Nutrient Removal Activated Sludge Systems, Water Sci. Tech., 29(7), 295-299, 1994.
21 Van Dijk, J. C. and Braakensiek, H. Phosphate removal by crystallization in a fluidized bed. Wat. Sci. Tech., 17, 133-142 (1985).
22 Battistoni, P., Pavan, P., Cecchi, F. and Mata-Alvarez, J. Phosphate removal in real anaerobic supernatants: Modelling and performance of a fluidized bed reactor. Wat. Sci. Tech., 38, 275-283 (1998).
23 Zweger B, Arnold E and Wildever P A, Nutrient Balances for Combined Nitrification and Denitrification in Biofilters, Water Sci. Tech., 4(4), 91-95, 2000.

Therefore what is claimed is:

1. A gas-liquid-solid circulating fluidized bed system, comprising:

a first fluidized bed;

solid particles having effective immobilized bacteria coated thereon, means to feed said solid particles having effective immobilized bacteria coated thereon into said first fluidized bed adjacent to a first end of said first fluidized bed and means to feed a first fluid into said first fluidized bed adjacent to a second end of said first fluidized bed, said second end being remote from said first end so that said solid particles and said first fluid flow in counter current, a clarifier means in flow communication with said first fluidized bed for separating solid particles from fluid and exhausting such separated fluid to provide separated solid particles which settle back into the first fluidized bed in order to minimize the loss of particles through the effluent;

a second fluidized bed, said second fluidized bed being a riser fluidized bed wherein a means for introducing solid particles and a means for introducing a second fluid into said second fluidized bed are both adjacent to one end of said second fluidized bed so that said solid particles and said second fluid introduced into said second bed flow concurrently through said second bed from said one end toward another end of said second fluidized bed remote from said one end, gas injection means to inject gas into one or both of the first and second fluidized beds;

a fluid-solid separator means in flow communication with said riser fluidized bed for separating said solid particles from the second fluid and exhausting the separated second fluid to provide separated solid particles;

first means connecting said first fluidized bed to said second fluidized bed adjacent to said second end of said first fluidized bed and said one end of said second fluidized bed, said first connecting means includes means to feed said solid particles into said second fluidized bed; and second means connecting said first and said second fluidized beds adjacent said first end of said first bed and said other end of said second fluidized bed, said second connecting means includes said means to feed the solid particles into said first fluidized bed.

2. The gas-liquid-solid circulating fluidized bed system according to claim 1 wherein said gas injection means is connected to said first fluidized bed, and wherein said first fluidized bed includes an aerobic zone for biodegrading wastewater predominately by the immobilized bacteria in the presence of oxygen.

3. The gas-liquid-solid circulating fluidized bed system according to claim 2 wherein said second fluidized bed includes an anoxic zone for denitrification, and an anaerobic zone for phosphorus release.

4. The gas-liquid-solid circulating fluidized bed system according to claim 2 wherein said gas injected into the first fluidized bed contains oxygen.

5. The gas-liquid-solid circulating fluidized bed system according to claim 1 wherein said gas injection means is connected to said second fluidized bed, and wherein said second fluidized bed includes an aerobic zone for biodegrading wastewater predominantly by the immobilized bacteria in the presence of oxygen.

6. The gas-liquid-solid circulating fluidized bed system according to claim 5 wherein said first fluidized bed includes an anoxic zone for denitrification and an anaerobic zone for phosphorus release.

7. The gas-liquid-solid circulating fluidized bed system according to claim 5 wherein said gas injected into the second fluidized bed contains oxygen.

8. The gas-liquid-solid circulating fluidized bed system according to claim 1 wherein said first means connecting is adapted to form a first hydraulic seal between said first and second fluidized beds, and wherein said second means connecting is adapted to form a second hydraulic seal between said first and second fluidized beds.

9. The gas-liquid-solid circulating fluidized bed system according to claim 8 wherein said first hydraulic seal is a first moving packed bed, and wherein said second hydraulic seal is a second moving packed bed.

10. The gas-liquid-solid circulating fluidized bed system according to claim 1 wherein said first fluidized bed is a counter-current fluidized bed.

11. The gas-liquid-solid circulating fluidized bed system according to claim 1 wherein said second fluidized bed is a riser bed operated in a circulating fluidization regime.

12. The gas-liquid-solid circulating fluidized bed system according to claim 1 wherein said first and second liquid fluidized beds are substantially vertical columns.

13. The gas-liquid-solid circulating fluidized bed system as defined in claim 12 wherein said first end of said first fluidized bed is the top end, said second end of said first fluidized bed is the bottom end, said one end of the second fluidized bed is the bottom end and said other end of said second fluidized bed is the top end.

14. The gas-liquid-solid circulating fluidized bed system as defined in claim 13 wherein said first fluid essentially flows upwards and said solids essentially flow downwards to form a counter current flow in said first fluidized bed, and wherein said second fluid and solid particles both essentially flow upwards concurrently in the second fluidized bed.

15. The gas-liquid-solid circulating fluidized bed system as defined in claim 14 wherein said fluid-solid separator means is located at the top end of said second fluidized bed.

16. The gas-liquid-solid circulating fluidized bed system as defined in claim 15 wherein said separator means includes fluid circulating means for circulating at least some of the exhausted fluid separated from the solid particles back to the bottom end of said second liquid fluidized bed.

17. The gas-liquid-solid circulating fluidized bed system as defined in claim 15 wherein said separator means includes fluid circulating means for circulating at least some of the exhausted fluid separated from the solids back to a middle of said second liquid fluidized bed.

18. The gas-liquid-solid circulating fluidized bed system as defined in claim 15 wherein said clarifier means is located at said first end of said first liquid fluidized bed.

19. The gas-liquid-solid circulating fluidized bed system as defined in claim 18 wherein said clarifier means includes fluid circulating means for circulating at least some the fluid separated from the solid particles back to the second end of said first liquid fluidized bed and removing at least a portion of the remaining fluid separated from the solid particles from the system as treated effluent.

20. The gas-liquid-solid circulating fluidized bed system as defined in claim 18 wherein said clarifier means includes sludge withdrawal means for exhausting sloughed sludge formed during the process.

* * * * *